July 11, 1944.  G. F. WITTMAN  2,353,379
VERTICAL INTERNAL GRINDING MACHINE
Filed Aug. 12, 1942  3 Sheets-Sheet 1
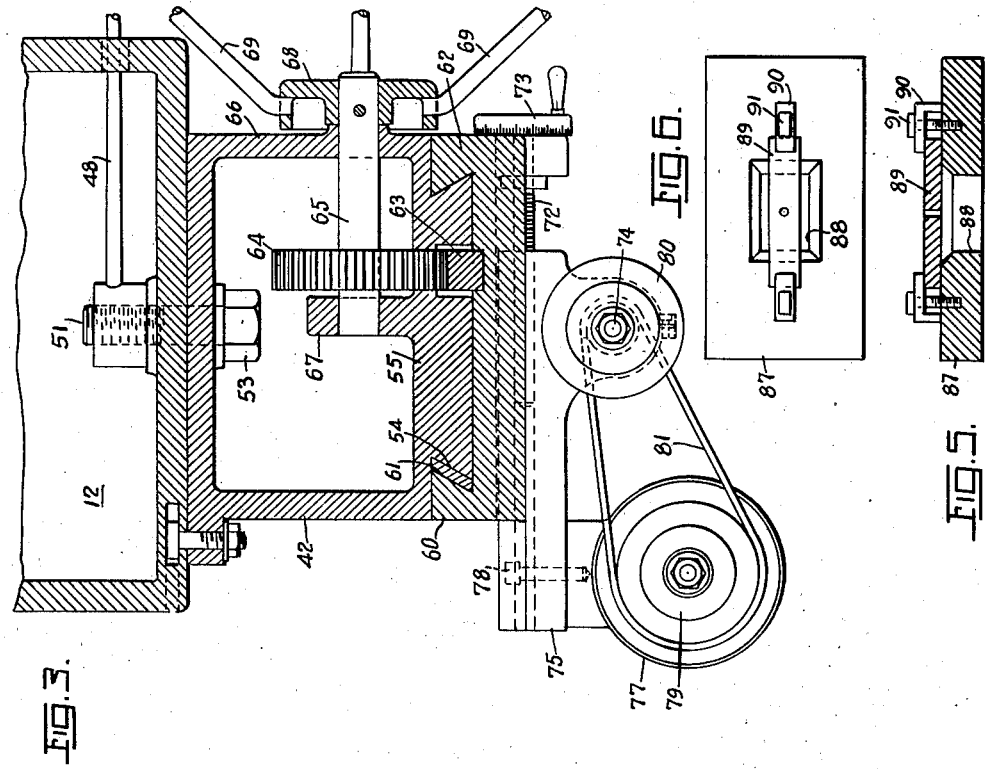
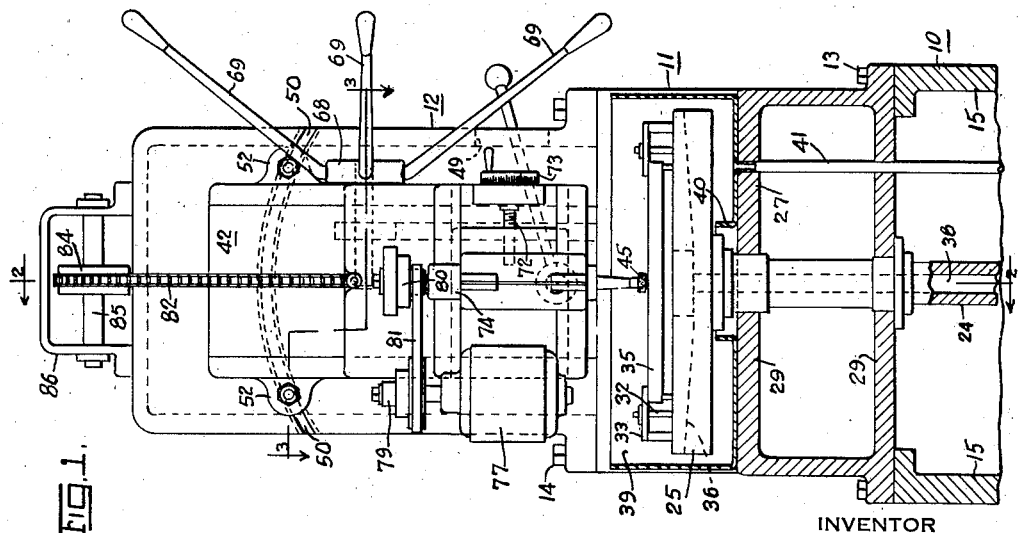
INVENTOR
GEORGE F. WITTMAN,
BY
Toulmin & Toulmin
ATTORNEYS

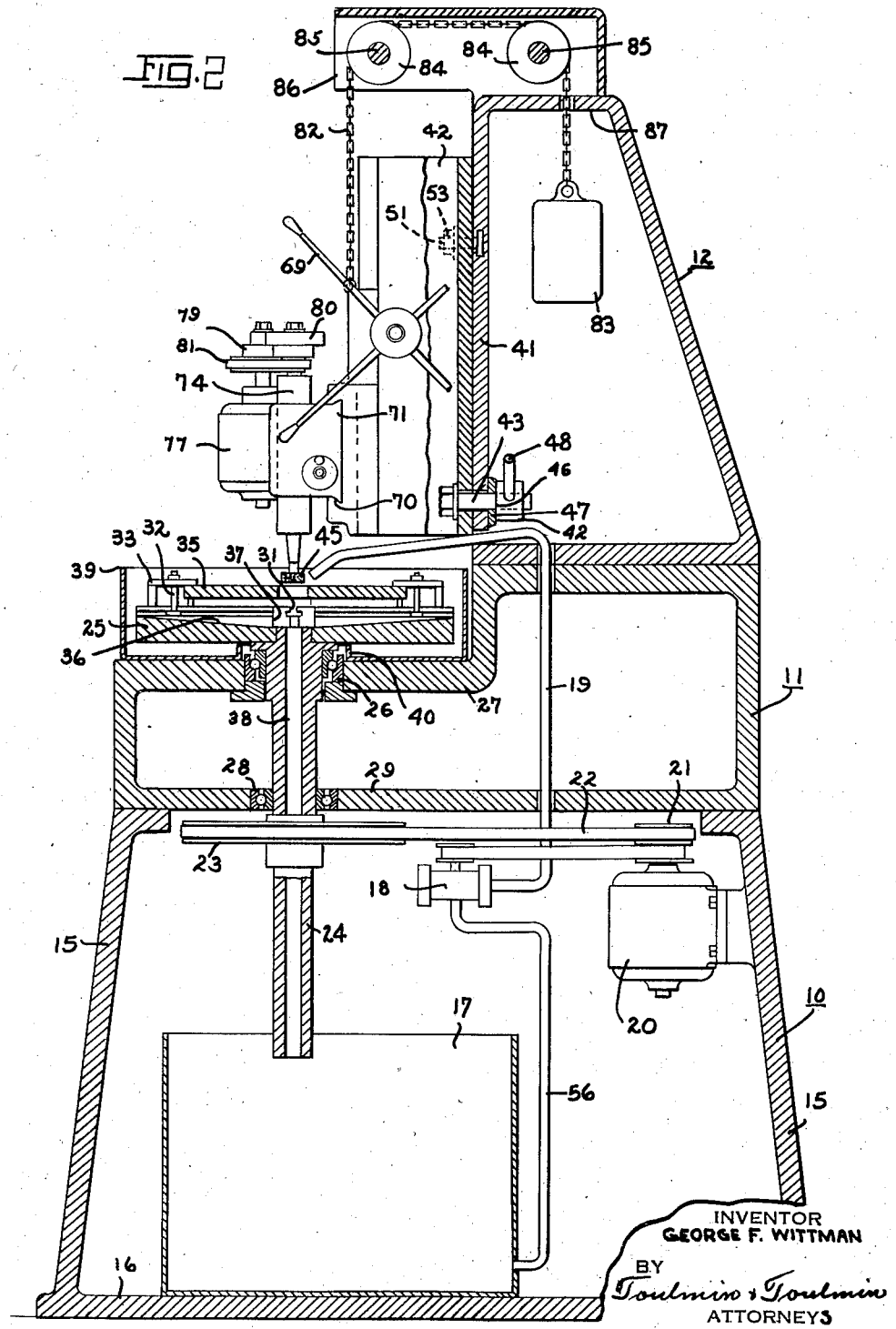

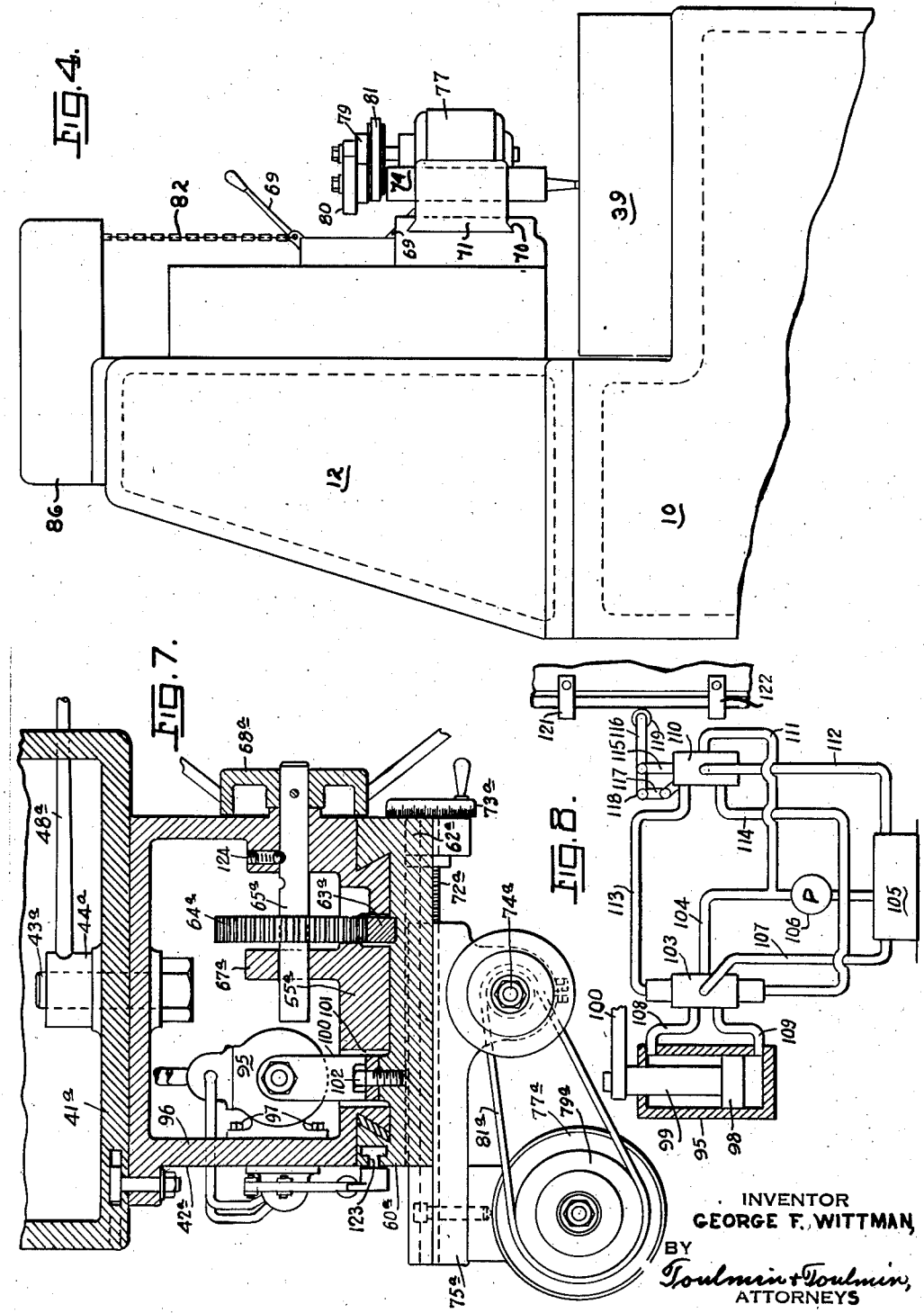

Patented July 11, 1944

2,353,379

UNITED STATES PATENT OFFICE 2,353,379

VERTICAL INTERNAL GRINDING MACHINE

George F. Wittman, Dayton, Ohio

Application August 12, 1942, Serial No. 454,499

7 Claims. (Cl. 51—50)

This invention relates to a vertical internal grinding machine.

An object of the invention is to provide a vertical internal grinding machine that is constructed and arranged in a simplified manner to reduce the complexity of a grinding machine of this type and to provide more efficient operation of such a machine.

Another object of the invention is to provide a vertical internal grinding machine that is provided with a horizontal work supporting table that is adapted to be driven by a suitable source of power for rotating the work with respect to the grinding spindle of the machine and thereby produce openings of any desired diameter.

It is another object of the invention to provide a grinding machine having a vertically disposed grinding spindle that can be positioned angularly with respect to a work support table to produce taper grinding in a work piece supported upon the table.

It is another object of the invention to provide a vertical grinding machine that is constructed and arranged in a manner that a suitable coolant can be circulated over the work and the grinding wheel during the vertical grinding operation.

It is another object of the invention to provide a vertical internal grinding machine that is constructed and arranged in a manner that three principal subassemblies of the machine can be secured together to produce a complete apparatus.

It is another object of the invention to provide a vertical internal grinding machine with a power system for automatically reciprocating a vertically arranged grinding spindle.

It is another object of the invention to provide a grinding machine constructed and arranged in accordance with the foregoing object wherein the grinding head is carried upon a guide head that is pivotally supported upon the frame of the grinding machine so that the guide head and the grinding head can be positioned angularly with respect to a vertical axis through a work table disposed beneath the grinding head so that tapered openings can be produced upon work carried by the work table.

It is another object of the invention to provide a hydraulic control system for a vertical internal grinding machine that automatically controls the reciprocating movement of the grinding head.

It is another object of the invention to provide a vertical internal grinding machine that is constructed and arranged for circulating a coolant over the work during the grinding operation, and wherein the main body of the circulating coolant is collected at the center of the table that supports the work for directing the same to a suitable reservoir.

Further objects and advantages will become apparent from the drawings and the following description.

In the drawings:

Figure 1 is a front elevational view of the vertical internal grinding machine of this invention, having a portion thereof in cross section to show the work table and coolant collecting pan.

Figure 2 is a vertical cross sectional view of the machine taken along line 2—2 of Figure 1.

Figure 3 is a transverse cross sectional view taken along line 3—3 of Figure 2.

Figure 4 is a side elevational view of the machine.

Figure 5 is a cross sectional view of an adaptor plate for use upon the main work table of the machine when grinding small work pieces.

Figure 6 is a plan view of the adaptor plate shown in Figure 5.

Figure 7 is a transverse cross sectional view of the machine similar to Figure 3, but showing a modified form of the apparatus wherein the grinding head is power driven under automatic control of a hydraulic control system.

Figure 8 is a diagrammatic view of the hydraulic control system for operating the grinding head.

In this invention the vertical internal grinding machine consists of three principal structural sections consisting of a base section 10, a work table and work supporting section 11 and a grinding head section 12 which are adapted to be suitably secured together as by means of bolts to produce a complete grinding machine. The table section 11 is fastened to the base section 10 by means of the bolts 13 and the grinding head section is secured to the table section by means of the bolts 14.

The base section 10 may be constructed from four wall sections 15 that are integral with one another to form a substantially hollow rectangular member. A suitable bottom wall 16 may be integral with the side walls 15 for supporting a coolant tank 17. A coolant pump 18 is disposed within the base section 10 and is provided with a suitable fluid inlet conduit 56 for receiving fluid from the coolant tank 17 and is adapted to deliver the coolant under pressure to the discharge line 19 that delivers same to above a work table to be hereinafter described. An electric motor 20 is mounted upon one of the side walls 15, and is provided with a pulley 21 driving a belt 22 that extends over a pulley 23 secured upon a support column 24 extending from the work table section 11.

The support column 24 carries a work table 25 secured to the upper end thereof. The column 24 is bearinged in the table section 11 by means of a ball bearing member 26 provided in the upper wall 27 of the table section 11, and a bearing member 28 disposed within the lower wall 29 of the table section 11. The upper bearing 26 is engaged by a flange 30 extending from the support column 24 for supporting the work table 25, whereby the bearing 26 becomes the thrust bearing for the work table 25.

The work table 25 is provided with a plurality of inverted T-slots 31 extending radially from the center of the table. These slots 31 receive T-headed bolts 32 that are adapted to cooperate with clamps 33 for securing a work piece 35 upon the table. The bottom wall 36 of the T-slots 31 is tapered downwardly from a horizontal plane toward the center of the work table 25 so that cooling fluid directed upon the table will drain toward a center opening 37 provided therein. The center opening 37 is disposed on the axis of the work table 25 and therefore over the axis of the support column 24 which is provided with a longitudinal passage 38 extending therethru for returning cooling fluid to the tank 17. A coolant collecting pan 39 is supported upon an upper wall 27 of the section 11 in which the work table 25 is disposed, an upwardly turned flange 40 forming a central opening thru which the support column 24 extends and providing a baffle wall to prevent cooling fluid from draining upon the bearing 26. A drain pipe 41 connects the pan 39 with the fluid supply tank 17. The fluid discharge line 19, previously mentioned has the end thereof disposed adjacent the center of the work table 25 to supply cooling fluid to a grinding wheel 45 when working upon the work piece 35.

The grinding head section 12 consists of a hollow frame having a front wall 41 disposed in a vertical plane. The front wall 41 supports a guide head 42. A pivot bolt 43 extending thru the guide head 42 and the front wall 41 upon which the guide head is adapted to be rotated. The pivot bolt 43 carries a threaded member 44 in threaded engagement with the pivot bolt 43. The member 44 is provided with a cam face 46 adapted to cooperate with a cam face provided on the boss 47 on the rear face of the front wall 41. The member 44 thereby forms a clamp member for tightening the head of the pivot bolt 43 against the guide head 42 to clamp the same upon the front wall 41 of the grinding head section 12. A suitable handle 48 is secured to the clamping member 44 and extends thru a slot 49 provided in a side wall of the grinding head section 12 so that an operator can grasp the handle 48 to operate the clamp member 44, it being understood of course that the bolt 43 is prevented from rotating in any suitable manner so that the cam faces provided on the clamp member 44 and the boss 47 will cooperate to clamp the guide head 42 to the front wall 41 of the grinding head section 12.

The front wall 41 of the grinding head section 12 is also provided with an arcuately shaped T-slot 50. T-headed bolts 51 are disposed within the T-slots 50 and extend thru ears 52 provided on the guide head 42. A nut 53 is provided upon each of the bolts 51 to clamp the ears 52 to the face of the front wall 41 and thereby retain the upper end of the guide head 42 rigid with respect to the section 12.

The guide head 42 consists of a substantially rectangular hollow frame section that is provided with a mole dove tail 54 on the front wall 55 which forms a guide track for a grinding head 60 having a female dove tail 61 cooperating with the dove tail 54 to direct the movement of the grinding head 60 thereon.

The grinding head 60 consists of a carriage 62 that is provided with the female dove tail 61. The carriage 62 has a rack 63 secured to the rear face thereof that engages a spur gear 64 carried upon a shaft 65 bearinged between the side wall 66 of the guide head 42 and a boss 67 provided within the guide head 42. A wheel 68 is secured to the end of the shaft 65 that extends beyond the guide head 42 and carries arms 69 for manually rotating the wheel 68 and thus the gear 64 for reciprocating the rack 63 and thereby reciprocating the carriage 62 upon the guide track 54.

The carriage 62 is also provided with a horizontally arranged female dove tail 70 that receives a male dove tail 71 provided on a spindle carriage 75, the spindle carriage 75 being movable transversely upon the carriage 62 by means of a lead screw 72 that is in threaded engagement with the spindle carriage 75 and provided with a micrometer control 73 for adjusting the transverse position of the spindle carriage 75 upon the carriage 62.

The spindle carriage 75 supports a grinding spindle 74 that is suitably secured thereto with the axis of the spindle extending vertically, which spindle carries the grinding wheel 45 previously mentioned. The grinding spindle 74 may be of any conventional construction, many of which are manufactured for the open market today. An electric motor 77 is secured to the spindle carriage 75 in any suitable manner as by bolts 78. Stepped pulleys 79 and 80 are provided on the shaft of the motor 77 and on the drive shaft of the grinding spindle 80 respectively, that are interconnected by means of a belt 81 whereby the grinding spindle 74 is driven for rotating the grinding wheel 45. While an electric motor drive has been shown herein as the means for driving the grinding spindle 74 yet it may be understood that other forms of driving means can be provided for driving the grinding spindle 74 such as an air motor or other suitable power means. It is also within the purview of the disclosure that the grinding spindle 74 can be a unitary structure which includes its own power source such as an air motor so that it will not be necessary to provide an independent source of power for the grinding spindle.

The guide head 42 is provided with a chain 82 that has a counterweight 83 on the opposite end thereof, the chain 82 passing over the pulleys 84 carried upon the shafts 85 carried in the frame member 86 secured to the top wall 87 of the grinding head section 12, the counterweight 83 being positioned within the hollow interior of the grinding head section 12. The counterweight 83 balances the weight of the carriage 62 and the spindle carriage 65 so that they can be freely moved upon the guide track 54 on the guide head 42 with a minimum amount of effort. The pulleys 84 are freely mounted on the shafts 85 so that they can slide axially thereon, thereby the chain 82 will always be positioned vertically when the guide head 42 is disposed angularly upon the grinding head section 12.

As previously mentioned the center of the work table 25 is provided with the opening 37 for collecting cooling fluid that is supplied over the grinding wheel 45 to return the same to the supply tank 17. When small work pieces are to have work performed upon them it may be that they could not normally be supported over the large opening 37. Therefore, it is desirable to provide an adaptor plate to partially cover the opening 37 so that the small work piece, or the opening to be ground therein can be placed under the axis of the grinding spindle 74. This adaptor plate is shown in Figs. 5 and 6, and consists of a plate 87 provided with an opening 88 that is substantially smaller than the opening 37, the plate 87 being substantially larger than the opening 37 so that a small work piece 89 can be supported upon the adaptor plate 87 by means of the clamps 90 secured thereto by the bolts 91.

In Fig. 7 there is shown a hydraulic power mechanism for a vertical internal grinding machine as heretofore described, the parts of the machine that are identical with those heretofore described will bear the same reference numeral but with the suffix *a*.

In the arrangement shown in Fig. 7 a hydraulic power mechanism is provided for automatically reciprocating the carriage 62a upon the guide head 42a. A double acting hydraulic motor 95 is positioned within the hollow interior of the guide head 42a and is suitably secured to the side wall 96 thereof as by means of bolts 97. The hydraulic motor 95 is provided with a piston 98 having a plunger 99 extending therefrom, as shown in Fig. 8, that is secured to an arm 100 extending from the rear wall of the carriage 62a through a slot 101 provided in the front wall 55a of the guide head 42a. The arm 100 is secured to the carriage 62a by means of bolts 102.

Referring to Fig. 8, the hydraulic system for the motor 95 consists of a four way valve 103 having a fluid pressure conduit 104 that connects the same to a supply source 105 through a pump 106 driven by a suitable power source which may be the motor 20 of the machine. The valve 103 has a discharge line 107 that connects the same with the supply reservoir 105, and has conduits 108 and 109 connecting the valve 103 with opposite ends of the hydraulic motor 95 for reciprocating the same depending upon the direction of flow of fluid through the four way valve 103 in the well known manner.

The four way valve 103 can be operated directly from the reciprocation of the carriage 62, or as shown in Fig. 8, a pilot valve 110 can be provided. The pilot valve 110 is another four way valve that is provided with a fluid pressure inlet conduit 111 and a waste conduit 112. Conduits 113 and 114 connect with opposite ends of the four way valve 103 to apply pressure upon alternate ends of the valve 103 according to the direction of flow of pressure flow through the pilot valve 110 in the well known manner of the operation of four way valves. The arrangement thereby provides power actuation of the four way valve 103.

The pilot valve 110 is provided with a plunger 115 extending therefrom and is pivotally connected to an arm 116 that is pivoted to an arm 117 by the pin 118. The opposite end of the arm 116 has a roller 119 adapted to engage an upper stop 121 and a lower stop 122 carried in a T-slot 123 to permit their adjustment relative to one another and thereby control the stroke of the carriage 62a.

When the roller 119 strikes the upper stop 121 the pilot valve 110 will be shifted to direct the flow of fluid therethrough to the four way valve 103 to shift the same to cause the carriage 62a to reverse its motion and move in a downward direction. Of course when the roller 119 strikes the lower stop 122 the reverse operation takes place.

To provide for manual or automatic reciprocation of the carriage 62a the gear 64a is movable transversely with respect to the rack 63a, the shaft 65a carrying the gear 64a being slidable in its bearings to move the same to two positions, one of which places the gear 64a in engagement with the rack 63a, and the other out of engagement therewith. A detent 124 holds the gear 64a in one or the other of the positions, the wheel 68a being moved manually to select the position of the gear 64a.

While the apparatus disclosed and described herein constitutes a preferred form of the invention yet it is to be understood that the apparatus is capable of mechanical alteration without departing from the spirit of the invention, and that all such modifications as fall within the scope of the appended claims are intended to be included herein.

Having thus fully described my invention what I claim as new and desire to secure by Letters Patent is:

1. A vertical grinding machine having a frame that is constructed in principal sub-section assemblies including, a base section having a cooling fluid supply reservoir supported thereby and a power source therein, a work table supporting section positioned on said base section and secured thereto and having a work table rotatably disposed thereon with a support shaft for said table extending through said work table section into said base section, means drivingly connecting said power source in said base section to said supporting shaft for driving said work table, and a grinding head section supported on said work table section and secured thereto and having thereon a guide head, means pivotally mounting the guide head for changing the angular relation thereof with respect to said table, a vertically reciprocable carriage on said guide head, and a horizontally reciprocable spindle carriage having a spindle thereon mounted on said first carriage with the spindle disposed with the axis thereof normal to said work table but changeable in accordance with the setting of said guide head.

2. A vertical grinding machine comprising in combination; a hollow base; a rotatable work table carried by said base positioned with the top thereof horizontal; a drive shaft for said table extending into said base; power means mounted in said base and drivingly connected to said drive shaft; and a grinding head including a frame having a planar vertical wall, a guide head on said frame having a planar wall in sliding engagement with said first mentioned wall, pivot means extending through said walls and disposed closely adjacent the lower edge of said wall on said guide head, an arcuate T slot means in said wall of said frame disposed on a radius from said pivot means, the T bolt means extending from said guide head into engagement with said slot to guide rotation of said guide head about said pivot means and secure said walls in engagement with one another, locking means operably associated with said pivot means to provide additional means for securing said walls together, a vertically reciprocable carriage on said guide head, a transversely reciprocable carriage on said first carriage, and a grinding spindle supported upon said second carriage and having the axis thereof disposed normal to the plane of said work table but changeable in accordance with the setting of said guide head.

3. A vertical grinding machine comprising in combination; a hollow base; a rotatable work table carried by said base positioned with the top thereof horizontal; a drive shaft for said table extending into said base; power means mounted in said base and drivingly connected to said drive shaft; and a grinding head including a frame having a planar vertical wall, a hollow box frame forming a guide head and having a planar wall in sliding engagement with said first mentioned wall, pivot means about which said box frame rotates extending through the rear wall of said box frame and said first mentioned wall disposed adjacent the lower edge of said box frame, locking means operably associated with said pivot means for locking said box frame to said wall of said frame, an arcuate T slot means in said wall of said frame disposed on a radius from said pivot means, T bolt means extending between said box frame and said slot to provide additional means to immovably secure said box frame upon said wall, vertically disposed guide means on the front wall of said box frame, a carriage slidably disposed upon said guide means having a rack associated therewith, a pinion positioned within said box frame upon shaft means and extending through the front wall thereof into engagement with said rack, means on said shaft means for rotating said pinion to thereby reciprocate said carriage, horizontally positioned guide track means on said carriage, a second carriage positioned upon said second mentioned guide track means, a vertically disposed grinding spindle carried upon said second carriage, and power means for said spindle support upon said second carriage and drivingly connected to said spindle.

4. A vertical grinding machine comprising in combination; a hollow base; a rotatable work table carried by said base positioned with the top thereof horizontal; a drive shaft for said table extending into said base; power means mounted in said base and drivingly connected to said drive shaft; and a grinding head including a frame having a planar vertical wall; a hollow box frame forming a guide head and having a planar wall in sliding engagement with said first mentioned wall, pivot means extending through the rear wall of said box frame and said first mentioned wall disposed adjacent the lower edge of said box frame, means extending between said box frame and said first mentioned wall to immovably secure said box frame upon said wall, vertically disposed guide means on the front wall of said box frame, a carriage slidably disposed upon said guide means having a rack associated therewith, a pinion positioned within said box frame upon shaft means and extending through the front wall thereof into engagement with said rack, means on said shaft means for rotating said pinion to thereby reciprocate said carriage, power means positioned within said box frame having a reciprocating element, means extending from said carriage through an opening in the front wall of said box frame into engagement with said reciprocating element whereby said carriage can be reciprocated by said power means, horizontally positioned guide track means on said carriage, a second carriage positioned upon said second mentioned guide track means, a vertically disposed grinding spindle carried upon said second carriage, and power means for said spindle supported upon said second carriage and drivingly connected to said spindle.

5. A vertical grinding machine comprising in combination; a hollow base; a rotatable work table carried by said base positioned with the top thereof horizontal; a drive shaft for said table extending into said base; power means mounted in said base and drivingly connected to said drive shaft; and a grinding head including a frame having a planar vertical wall, a hollow box frame forming a guide head and having a planar wall in sliding engagement with said first mentioned wall, pivot means extending through the rear wall of said box frame and said first mentioned wall disposed adjacent the lower edge of said box frame, means extending between said box frame and said first mentioned wall to immovably secure said box frame upon said wall, vertically disposed guide means on the front wall of said box frame, a carriage slidably disposed upon said guide means having a rack associated therewith, a pinion positioned within said box frame upon shaft means and extending through the front wall thereof into engagement with said rack, means on said shaft means for rotating said pinion to thereby reciprocate said carriage, power means positioned within said box frame having a reciprocating element, means extending from said carriage through an opening in the front wall of said box frame into engagement with said reciprocating element whereby said carriage can be reciprocated by said power means, said shaft means being slidable in said box frame for shifting said pinion out of engagement with said rack and including indent means for holding said shaft in either selected position, horizontally positioned guide track means on said carriage, a second carriage positioned upon said second mentioned guide track means, a vertically disposed grinding spindle carried upon said second carriage, and power means for said spindle supported upon said second carriage and drivingly connected to said spindle.

6. A grinding machine including in combination, a hollow base, a rotatable work table supported upon said base and disposed horizontally, a drive shaft for said work table extending into said base and having a central bore therethrough that terminates at the surface of said table, a source of cooling fluid within said base, power means supported within said base for rotating said table and for driving a pump positioned within said base for circulating cooling fluid from said source to above the surface of said table, means supporting a grinding spindle with the axis thereof disposed vertically above said table in a position that the grinding operation will be performed directly above said bore in said drive shaft for said table, whereby cooling fluid circulated over the grinding operation will be drained from said work table through said bore in said drive shaft for the same, radially disposed drain passages in the surface of said table directed angularly downwardly toward said bore in said drive shaft to drain the surface of said table, a drain pan surrounding said table to receive fluid centrifuged from the table, and a drain passage from said pan to remove fluid collected therein.

7. A vertical grinding machine having a frame that is constructed in principal sub-section assembly units including, a base unit having a cooling fluid supply reservoir supported thereby and a power source therein, a work table supporting unit positioned on said base unit and secured thereto and having a work table rotatably disposed thereon with a support shaft for said table extending through said work table unit into said base unit, said support shaft having an axial bore therethrough terminating at the surface of said work table, a pump, means connecting said pump to said reservoir and for conducting fluid to above the surface of said table, means drivingly connecting said power source in said base section to said supporting shaft for driving said work table and said pump to thereby rotate said work table and supply cooling fluid above the surface of said table for a grinding operation, said cooling fluid being drained from said work table through said bore in said shaft, and a grinding head unit supported on said work table unit and secured thereto and including a frame supporting a guide head, means pivotally mounting the guide head on said frame for changing the angular relation thereof with respect to said table, a vertically reciprocable carriage on said guide head, and a horizontally reciprocable spindle carriage having a spindle thereon mounted on said first carriage with the spindle disposed with the axis thereof normal to said work table but changeable in accordance with the setting of said guide head.

GEORGE F. WITTMAN.